US010933852B2

(12) United States Patent
Goers et al.

(10) Patent No.: US 10,933,852 B2
(45) Date of Patent: Mar. 2, 2021

(54) BRAKE SYSTEM FOR A VEHICLE TRAIN AND TRACTOR THEREWITH

(71) Applicant: WABCO GmbH, Hannover (DE)

(72) Inventors: Andreas Goers, Pattensen (DE); Thomas Müller, Hannover (DE); Jakob Friedrich Schmidt, Hannover (DE)

(73) Assignee: WABCO GmbH, Hannover (DE)

( * ) Notice: Subject to any disclaimer, the term of this patent is extended or adjusted under 35 U.S.C. 154(b) by 172 days.

(21) Appl. No.: 16/282,814

(22) Filed: Feb. 22, 2019

(65) Prior Publication Data
US 2019/0263371 A1  Aug. 29, 2019

(30) Foreign Application Priority Data

Feb. 23, 2018 (DE) ...................... 10 2018 104 143.8

(51) Int. Cl.
| | |
|---|---|
| *B60T 11/10* | (2006.01) |
| *B60T 7/20* | (2006.01) |
| *B60T 8/17* | (2006.01) |
| *B60T 8/171* | (2006.01) |
| *B60T 13/58* | (2006.01) |
| *B60T 13/66* | (2006.01) |

(Continued)

(52) U.S. Cl.
CPC ............... *B60T 11/108* (2013.01); *B60T 7/20* (2013.01); *B60T 8/171* (2013.01); *B60T 8/1708* (2013.01); *B60T 13/581* (2013.01); *B60T 13/662* (2013.01); *B60T 13/683* (2013.01); *B60T 15/027* (2013.01); *B60T 15/028* (2013.01); *B60T 2270/413* (2013.01)

(58) Field of Classification Search
CPC .................... B60T 11/108; B60T 2270/413
See application file for complete search history.

(56) References Cited

U.S. PATENT DOCUMENTS

| 4,671,578 A * | 6/1987 | Rothen | ..................... B60T 8/00 |
| | | | 303/15 |
| 6,512,452 B1 * | 1/2003 | Brannan | ................. B60T 13/74 |
| | | | 188/112 R |

(Continued)

FOREIGN PATENT DOCUMENTS

| DE | 102012000435 A1 | 7/2013 |
| DE | 102014002614 A1 | 8/2015 |
| EP | 2998177 A1 | 3/2016 |

*Primary Examiner* — Xuan Lan Nguyen
(74) *Attorney, Agent, or Firm* — Dickinson Wright PLLC

(57) ABSTRACT

A fluid-operated braking system (1) for a tractor-trailer vehicle includes a trailer control valve (2), a parking brake module (3), and an electronic control unit (4) electrically connected to the trailer control valve (2) and to the parking brake module (3). A pressure fluid accumulator (13) of the braking system (1) is connected to a control pressure input (P43) of the trailer control valve (2). A redundancy circuit controls the control pressure input (P43), even during a malfunction of the control unit (4). The parking brake module (3) includes a control valve (14), a redundancy valve (15) and a changeover valve (16) controlled by an electronic switch unit (20) with a holding function. When the control unit (4) malfunctions, the last error-free switching position of the control valve (14) or the redundancy valve is maintained until a operationally safe resting state is reached or the ignition system is switched off.

5 Claims, 2 Drawing Sheets

(51) Int. Cl.
*B60T 15/02* (2006.01)
*B60T 13/68* (2006.01)

(56) References Cited

U.S. PATENT DOCUMENTS

| | | | | |
|---|---|---|---|---|
| 8,282,173 | B2* | 10/2012 | Forster | B60T 13/263 |
| | | | | 303/7 |
| 8,560,162 | B2* | 10/2013 | Herges | B60T 8/327 |
| | | | | 701/29.7 |
| 9,327,694 | B2* | 5/2016 | Klostermann | B60T 11/108 |
| 9,573,577 | B2* | 2/2017 | Hilberer | B60T 17/04 |

* cited by examiner

BRAKE SYSTEM FOR A VEHICLE TRAIN AND TRACTOR THEREWITH

TECHNICAL FIELD

The present disclosure relates to a braking system for a motor vehicle, consisting of a tractor vehicle with a tractor vehicle brake and a trailer vehicle with a trailer brake, wherein the tractor vehicle has an ignition system for a drive engine of the tractor vehicle energized by an electrical energy accumulator of the tractor vehicle, wherein the braking system is fluid operated, having a trailer control valve and a parking brake module which are electrically controllable, and having an electronic control unit for the control of the trailer brake of the trailer vehicle, electrically connected to the trailer control valve and to the parking brake module, wherein the parking brake module is fluid-connected at the input side to a pressure fluid accumulator of the braking system of the motor vehicle and at the output side to a control pressure input of the trailer control valve for the switchable pressurization or depressurization of the control pressure input of the trailer control valve, and wherein the parking brake module has a redundancy circuit for the pressurization or depressurization of the control pressure input of the trailer control valve even for the case of a malfunction or a failure of the electronic control unit.

BACKGROUND

In a motor vehicle with a pneumatic/hydraulic braking system, a parking brake module is also designed to control a trailer brake of the trailer vehicle. The actuation generally occurs by an electronic control unit via a trailer control valve, which has an inverting control characteristic. When pressure fluid is applied to a control pressure input of the trailer control valve, i.e., when air is supplied in the case of a pneumatic brake, the brake cylinders of the trailer vehicle are depressurized, i.e., bled. For the parking of the trailer vehicle by the trailer brake, the control pressure input of the trailer control valve is bled in order to supply air to the trailer brake cylinders and thus actuate the trailer brake.

In order to prevent an unintentional and possibly safety-critical engaging of the trailer brake while moving or an unintentional releasing of the trailer brake when the motor vehicle is halted during a malfunction or a failure of the electronic control of the trailer brake, for example due to transmission errors, damaged lines, malfunctions, external voltages or short circuits, suitable safety measures are pre-scribed. For a trailer used in farming, this is regulated for example in EU standard 2015/68 for vehicle brakes of tractor-trailer combinations used in farming.

It is known also how to operate the parking brake of the trailer of a motor vehicle pneumatically by the driver using a lever. In the case of such an electropneumatic hand brake, the last state is usually maintained by a bistable pneumatic valve. Such bistable magnetic valves in a fluid system, such as a pressurized air system, make it possible to move between two valve positions, where both valve positions can be maintained in the de-energized state of the magnetic valve. A bistable magnetic valve comprises a permanent magnet mechanism and an armature which is movable relative to the permanent magnet mechanism and having energizable armature coils. After a first armature coil or second armature coil is energized, the armature can be moved into its first armature position or second armature position, in which it is securely maintained even after switching off the switching current, i.e., in the de-energized state. Electropneumatic hand brakes in the parked state of the motor vehicle thus require no energization. Furthermore, neither is any current and thus any energy consumption needed during driving, i.e., when the parking brake is disengaged.

DE 10 2012 000 435 A1 discloses a parking brake module for a fluid-operated braking system of a vehicle suitable for attaching a trailer. The parking brake module has a trailer control valve port for connecting to a trailer control valve for controlling a trailer brake of the trailer. Moreover, the parking brake module has an actuating valve, being a bistable electromagnetic valve with a bistable switching function. In this way, the vehicle can be safely parked by the parking brake module with the trailer brake of the trailer optionally being engaged or disengaged. The actuating valve has an actuating valve input, through which pressure fluid can be supplied even in the event of a voltage drop at the parking brake module in a first state of the parking brake module to reduce the pressure and in an alternatively adopted second state of the parking brake module to increase the pressure at the trailer control valve port.

DE 10 2014 002 614 A1 discloses a trailer control valve for a hydraulically braked tractor vehicle, which can be coupled to a pneumatically braked trailer vehicle. The tractor vehicle has a hydraulically operated service brake, having at least one main brake cylinder activatable by a brake activating member to generate a hydraulic pressure in at least one wheel brake cylinder of at least one wheel of the tractor vehicle, wherein at least one pressure sensor is connected to a hydraulic pressure line leaving the main brake cylinder in order to detect the hydraulic pressure. The trailer control valve has an electropneumatic pressure regulator module with an electronic control system, which receives at least the pressure signals from the pressure sensor and converts them into control pulses for electromagnetic control valves situated in the electropneumatic pressure regulator module. These control valves are connected at the input side via a pneumatic reservoir pressure input to a pressurized air tank and at the output side via a pneumatic control pressure output to a control pressure coupling head for attachment to the trailer brake. Moreover, the trailer control valve has a redundancy valve assembly, which is connected via a hydraulic control input to a hydraulic pressure line leaving the main brake cylinder and via a pneumatic input to the pressurized air tank. The hydraulic control pressure determines the degree of the pneumatic output pressure at a pneumatic output of the redundancy valve assembly. In the event of a failure of at least one electrical or electronic component relevant to the operation of the trailer control valve, the pneumatic output of the redundancy valve assembly is connected to the control pressure coupling head, while during error-free operation of the electrical or electronic components relevant to the operation of the trailer control valve the pneumatic output of the redundancy valve assembly is separated from the control pressure coupling head.

SUMMARY

Given this background, the problem which the invention proposed to solve was to propose a braking system for a motor vehicle that is safe in operation and that furthermore provides an economically manufactured electronically controlled parking brake module for a parking brake function of a trailer brake of a trailer vehicle. The braking system should also ensure a safe condition of the trailer brake at all times, even during a malfunction or a failure of an electronic control system of the trailer brake. In particular, such a parking brake module should be suitable for use in a braking system of a motor vehicle used in farming.

The present disclosure is based on the finding that a holding function of an electronic switch unit composed of interconnected logic components can be utilized in a braking system of a motor vehicle for the temporary freezing of input and/or output signals in order to ensure an operationally safe parking brake function of a trailer brake by the actuating of an additionally provided redundancy valve even in the redundancy situation of a failure of an electronic control of the braking system.

The present disclosure therefore starts from a braking system for a motor vehicle, consisting of a tractor vehicle with a tractor vehicle brake and a trailer vehicle with a trailer brake, wherein the tractor vehicle has an ignition system for a drive engine of the tractor vehicle energized by an electrical energy accumulator of the tractor vehicle, wherein the braking system is fluid operated, having a trailer control valve and a parking brake module which are electrically controllable, and having an electronic control unit for the control of the trailer brake of the trailer vehicle, electrically connected to the trailer control valve and to the parking brake module, wherein the parking brake module is fluid-connected at the input side to a pressure fluid accumulator of the braking system of the motor vehicle and at the output side to a control pressure input of the trailer control valve for the switchable pressurization or depressurization of the control pressure input of the trailer control valve, and wherein the parking brake module has a redundancy circuit for the pressurization or depressurization of the control pressure input of the trailer control valve even for the case of a malfunction or a failure of the electronic control unit.

In order to solve the stated problem, the invention proposes that the parking brake module comprises a first directional valve configured as a control valve, a second directional valve configured as a redundancy valve and a pressure-controlled changeover valve, wherein the control valve and the redundancy valve are respectively fluid-connected at the input side to the pressure fluid accumulator and at the output side to a respective input of the changeover valve, wherein one output of the changeover valve is fluid-connected to the control pressure input of the trailer control valve, so that an input pressure at one or both inputs of the changeover valve can be passed through to the control pressure input of the trailer control valve, wherein the control valve is switchably connectable by a first electrical switching device to the electrical energy accumulator of the tractor vehicle, wherein the redundancy valve is switchably connectable by a second electrical switching device to the electrical energy accumulator and to the ignition system of the tractor vehicle, wherein, in a first switching position of the control valve and/or the redundancy valve, the pressure fluid accumulator is blocked off from the control pressure input of the trailer control valve and in a second switching position of the control valve and/or the redundancy valve the pressure fluid accumulator is fluid-connected to the control pressure input of the trailer control valve, and that the electronic control unit comprises an electronic switch unit with a holding function, wherein the redundancy valve and the control valve are electronically interconnected and controllable by this switch unit, wherein the holding function saves the respective current first switching position or second switching position of the redundancy valve or the control valve, so that in the event of a recognized malfunction or a failure of the electronic control unit the last error-free switching position of the control valve or the redundancy valve is maintained so long as the electronic control unit does not switch to an operationally safe resting state or the ignition system is not switched off.

An electronic switch unit is understood to mean an assembly constructed from a plurality of logic switch elements, such as AND gates, OR gates, inverters and/or transfer gates to perform logic operations with the additional capability of a holding function to save individual variable states.

By this assembly, a braking system for a motor vehicle is provided with a cost-effective parking brake module for an operationally safe parking brake function of a trailer brake. In particular, the rules are satisfied for the actuating of a trailer brake of an agricultural motor vehicle pursuant to EU 2015/68. According to the invention, no costly bistable magnetic valves are needed for the parking brake module.

Accordingly, by an electronic switch unit, upon a failure of the electronic control unit of the braking system, the last switching position of the control valve of the parking brake module will be adopted by the redundancy valve. Via the holding function of the switch unit, upon recognizing a malfunction, the last state of the control valve will be transmitted to the redundancy valve and maintained. In this way, the function of the parking brake module can be maintained.

The control valve and the redundancy valve are connected via a changeover valve to the control pressure input of the trailer control valve. The changeover valve works like a priority valve or a select-high valve, so that when control and/or redundancy valves are switched open, the higher of the pressures present at the two inputs of the changeover valve will always be applied or, if only one pressure is present at one input or the pressures are the same at the inputs, that pressure will be applied to the control pressure input of the trailer control valve.

If the control valve is in its open position for example when a control error or a loss of control occurs, i.e., in the pressure connection between the pressure accumulator and the pressure fluid reservoir and the respective changeover valve input, the control pressure input of the trailer control valve will in any case continue to be supplied with air by the redundancy valve even upon failure of the control valve, since it will be held open by the holding function. The holding function in particular will be maintained for as long as the ignition of the vehicle is on, i.e., the motor vehicle has not been parked and the ignition shut off, or for as long as the control system does not automatically switch to an operationally safe state, preventing a possible further malfunction.

If the trailer control valve has an inverting switching characteristic, as usual, accordingly no control pressure will be generated at the output of the trailer control valve, i.e., at the "yellow" control pressure coupling head, when the control pressure input is subjected to the reservoir pressure from the pressure fluid accumulator. In this way, the brake cylinders of the trailer, or the spring accumulator parts or operating parts of these brake cylinders which are "normally engaged" or "normally disengaged" depending on the actuation and design type of the trailer brake, cannot be accidentally supplied with air.

On the contrary, if the control valve is in its closed position when an electronic control error occurs, the same applies in reverse manner, wherein no control pressure is present at the control pressure input of the trailer valve and no pressure decrease is created at the control pressure coupling head of the trailer according to the inverting switching of the trailer control valve. In any case, this means that the trailer cannot be braked unintentionally by the parking brake function during driving operation.

According to one embodiment of the invention it may be provided that the control valve and the redundancy valve are configured as 3/2-way directional valves which are electromagnetically actuatable in the opening direction and closed by spring force in the resting position. Advantageously, the valves for the parking brake module are 3/2-way directional valves. Such valves are standard components with no particular difficulties in their manufacture and use. In particular, no costly bistable magnetic valves, which must be connected in a cumbersome manner, are needed.

According to another embodiment of the invention it may be provided that the control valve and the redundancy valve are switchable independently of each other in a normal error-free operation of the electronic control unit. In this way, the redundancy valve causes no unnecessary energy consumption in the error-free operation.

According to another embodiment of the invention it may be provided that the first switching device and the second switching device have mutually decoupled electrical circuits for the electrical power supply of the control valve and the redundancy valve, wherein the control valve is assigned a first high-side switch, which connects the magnetic circuit of the control valve switchably to the electrical energy accumulator, wherein the control valve is assigned a first low-side switch, which connects the magnetic circuit of the control valve switchably to ground, and wherein the redundancy valve is assigned a second high-side switch, which connects the magnetic circuit of the redundancy valve switchably to the ignition system and to the electrical energy accumulator of the tractor vehicle, and wherein the redundancy valve is assigned a second low-side switch, which connects the magnetic circuit of the redundancy valve switchably to ground.

Accordingly, the actuation of the magnetic circuit of the redundancy valve by the memory circuit of the electronic switch unit may occur optionally on the connection side of the electrical energy accumulator or at the ignition switch of the ignition system of the vehicle or on the ground side. The actuation of the magnetic circuit of the control valve for the normal error-free operation may occur optionally on the connection side of the electrical energy accumulator or on the ground side. In this way, the electronic switch unit may be integrated with relatively little expense in an existing electronic control unit.

Finally, the invention also relates to a motor vehicle, such as a farming tractor vehicle and trailer combination, a semitrailer, or a platform road train, having a braking system with the above described features.

The invention will be explained more closely below with the aid of an exemplary embodiment represented in the accompanying drawings.

DETAILED DESCRIPTION OF THE DRAWINGS

Figure 1:
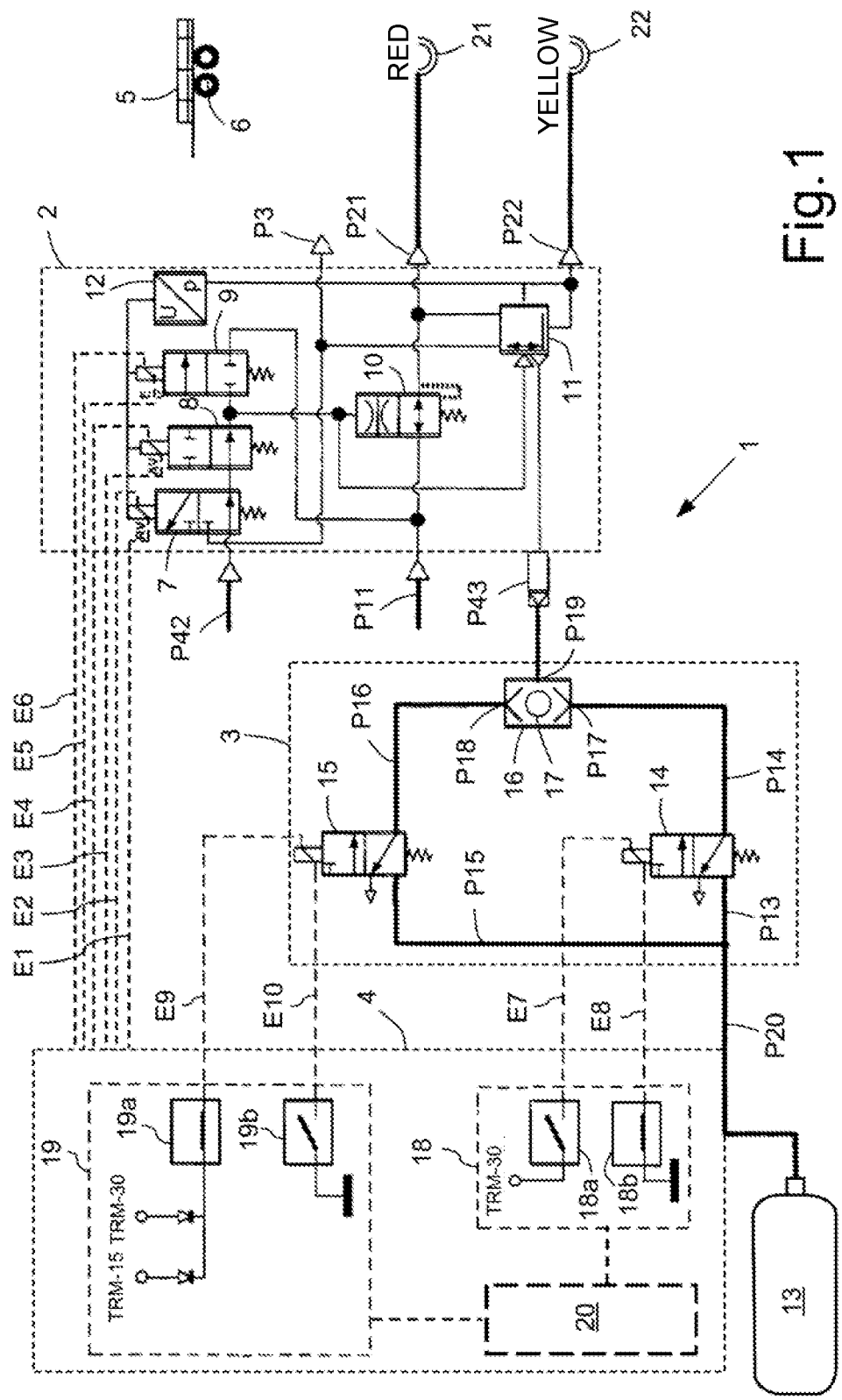
FIG. 1 shows a simplified circuit diagram of a braking system according to the invention.

FIG. 1 shows a braking system 1, such as can be provided for example for an airbraked farming motor vehicle, consisting of a tractor vehicle, not shown, and a trailer vehicle 5 only indicated in FIG. 1. The representation in FIG. 1 and the following description are basically confined to the components of such a braking system which are relevant to the invention. The pneumatic ports and lines of a trailer control valve are provided with reference symbols in accordance with DIN ISO 6786. For better differentiation between the reference symbols of the components, a prefix "P" has been added to all reference symbols for pneumatic lines and ports and a prefix "E" to all reference symbols for electrical lines.

Accordingly, the braking system 1 represented in FIG. 1 comprises an electropneumatic trailer control valve 2 and an electropneumatic parking brake module 3. Assigned to the trailer control valve 2 and the parking brake module 3 and electrically connected to them is an electronic control unit 4. Furthermore, the braking system 1 comprises a service brake module, not shown, for a service brake function of a service brake of the tractor vehicle, but that does not play any role here and therefore it need not be further discussed. Moreover, the parking brake module 3 has valve components, not shown, for a parking brake function of the tractor vehicle, which likewise play no role here and therefore shall not be further discussed. For these, refer to DE 10 2012 000 435 A1 mentioned at the beginning. The following description concentrates on the components of the trailer control valve 2 represented in FIG. 1 and the components of the parking brake module 3 which are relevant to the invention and which are yet to be described more closely, and those of the associated electronic control unit 4 for the control of a parking brake function of a trailer brake 6 of the trailer vehicle 5, only indicated in FIG. 1.

The trailer control valve 2 largely conforms to a known trailer control valve. It has three regulator valves 7, 8, 9 designed as electromagnetic directional valves. The first regulator valve 7 is designed as a 3/2-way directional valve and is electrically connected by a first and a second electrical line E1, E2 to the electronic control unit 4. The second regulator valve 8 is designed as a 2/2-directional valve and is electrically connected via a third and a fourth electrical line E3, E4 to the electronic control unit 4 and also pneumatically connected at the input side to the first regulator valve 7. The third regulator valve 9 is likewise designed as a 2/2-directional valve and is electrically connected via a fifth and a sixth electrical line E5, E6 to the electronic control unit 4 and also pneumatically connected at the input side to the second regulator valve 8 and to a throttle valve 10. According to another embodiment, the three regulator valves 7, 8, 9 are electrically connected by a respective control line and by a common ground line via a safety switch to the control unit 4. The throttle valve 10 may also be called a breakaway safety valve.

Furthermore, the trailer control valve 2 comprises a pressure valve 11 or relay valve, which is yet to be described more closely, and a pressure sensor 12, which in particular detects the pressure at a pneumatic control pressure output P22 of the trailer control valve 2 and provides this as a control parameter.

The trailer control valve 2 has three pneumatic inputs P11, P42, P43 and three pneumatic outputs P3, P21, P22. The reservoir pressure from a pressure fluid accumulator 13 is taken via a pneumatic connection, not shown, and via a first pneumatic trailer control valve input configured as the pneumatic reservoir pressure input P11 through the trailer control valve 2 and via a first pneumatic trailer control valve output configured as the reservoir pressure output P21 to a reservoir pressure coupling head 21 marked as "RED". This reservoir pressure coupling head 21 can be coupled to a corresponding coupling head of a reservoir line of the trailer brake 6 of the trailer vehicle 5, not shown.

The first regulator valve 7 is connected pneumatically directly to a second pneumatic trailer control valve input configured as the pneumatic redundancy pressure input P42. The parking brake module 3, yet to be described more closely, is pneumatically connected to a third pneumatic trailer control valve input configured as the control pressure input P43. The control pressure input P43 provides a pneumatic connection between the parking brake module 3 and the mechanical pressure valve 11 of the trailer control valve 2, which is switched in dependence on the pressure.

The pressure valve 11 is functionally connected at the input side to the other mentioned valves 7, 8, 9, 10 of the trailer control valve 2 and to the reservoir pressure input P11. The pressure valve 11 is moreover connected at the output side via a second pneumatic trailer control valve output configured as the control pressure output P22 to a "Yellow" marked control pressure coupling head 22. The control pressure coupling head 22 may be coupled to a corresponding coupling head of a control pressure line of the trailer brake 6, not shown. The control pressure line of the trailer brake 6, not shown, supplies the brake cylinders of the trailer vehicle 5, also not shown. Furthermore, the trailer control valve 2 also comprises a third pneumatic trailer control valve output, configured as the bleed outlet P3 of the trailer control valve 2.

The electrical and pneumatic interconnection of the valves 7, 8, 9, 10, 11 of the trailer control valve 2 and the resulting mode of functioning of the trailer control valve 2 is known per se and need not be described here in detail. The only thing of importance is that the trailer control valve 2 has an inverting switching characteristic. This means that a pressure decrease at the control pressure input P43 results in a pressure increase at the control pressure output P22 and a pressure increase at the control pressure input P43 results in a pressure decrease at the control pressure output P22. Thus, the trailer brake 6 is activated, for example, when the control pressure input P43 of the trailer control valve 2 is bled, and it is disengaged when the control pressure input P43 of the trailer control valve 2 is supplied with air, as long as the trailer brake 6 is not activated by the service brake.

In most countries it is mandated that both the parking brake of the tractor vehicle and the parking brake of the trailer vehicle 5 must be engaged in the parked state of a motor vehicle. While the parking brake of the tractor vehicle is usually held by spring force and released by pressurization against the spring force, the parking brake of the trailer vehicle 5 as mentioned above is held by the pressure force of the pressure fluid. In the case of a lengthy standstill of the motor vehicle, pressure losses may occur in the brake cylinders and thus a releasing of the trailer brake 6. However, the braking system 1 may have a trailer control function for this purpose, making possible a verification as to whether the motor vehicle can be held solely by the braking action of a parking brake of the tractor vehicle in the event of a slackening of the braking action of the trailer vehicle 5. On the contrary, it must be ensured that the parking brake of the trailer vehicle 5 cannot be accidentally engaged during driving operation of the motor vehicle in the event of a failure of the electronic control system of the braking system 1. This is accomplished in the invention by the parking brake module 3 and its actuation.

Accordingly, the parking brake module 3 comprises a control valve 14 and a redundancy valve 15, which are configured as electromagnetic 3/2-way directional valves which are closed in the de-energized state by spring force and opened in the energized state. Furthermore, the parking brake module 3 comprises a pressure-controlled changeover valve 16, which is configured as a double check valve with two pneumatic inputs P17, P18 and one pneumatic output P19.

The control valve 14 is connected at the input side via a first pneumatic line P20, which can also be connected to the reservoir pressure input P11 of the trailer control valve 2, and a second pneumatic line P13 to the pressure fluid accumulator 13. Furthermore, the control valve 14 is connected at the output side via a third pneumatic line P14 to a first pneumatic input P17 of the changeover valve 16. The redundancy valve 15 is connected via the first pneumatic line P20 and a fourth pneumatic line P15 at the input side to the pressure fluid accumulator 13. Moreover, the redundancy valve 15 is connected at the output side via a fifth pneumatic line P16 to a second pneumatic input P18 of the changeover valve 16.

The changeover valve 16 can be switched through by applying the reservoir pressure from the pressure fluid accumulator 13 either by activating the control valve 14 at its first input P17 or by activating the redundancy valve 15 at its second input P18, so that the reservoir pressure can be applied via the pneumatic output P19 of the changeover valve 16 to the inverting control pressure input P43 of the trailer control valve 2. If both control valve 14 and redundancy valve 15 are switched, and thus both inputs P17, P18 of the changeover valve 16 are subjected to pressurized air, the respectively higher pressure in the case of different pressures arrives at the control pressure input P43 of the trailer control valve 2 and the other respective input P17, P18 is blocked due to pressure by a closing member 17 of the changeover valve 20, or if the pressure is the same the two inputs P17, P18 of the changeover valve 16 remain open.

The electrical connection of the parking brake module 3 to the electronic control unit 4 of the braking system 1 is as follows: the control valve 14 is connected via a seventh and an eighth electrical line E7, E8 to a first electrical switching device 18. The seventh electrical line E7 comprises a first high-side switch 18a, by which the magnetic circuit of the control valve 14 can be connected to the plus pole terminal TRM-30 of an electrical energy accumulator, not shown, or disconnected from it. The eighth electrical line E8 comprises a first low-side switch 18b, which can be connected to ground or separated from ground by the magnetic circuit of the control valve 14.

The redundancy valve 15 is connected via two ninth and tenth electrical lines E9, E10 to a second electrical switching device 19. The ninth electrical line E9 comprises a second high-side switch 19a, by which the magnetic circuit of the redundancy valve 15 can be connected to the plus pole terminal TRM-30 of the electrical energy accumulator and to an output terminal TRM-15 of an ignition switch of an ignition system, not shown, behind the plus pole of the electrical energy accumulator, or disconnected from it. The tenth electrical line E8 comprises a second low-side switch 19b, by which the magnetic circuit of the redundancy valve 15 can be connected to ground or separated from ground. The control valve 14 and the redundancy valve 15 or their magnetic circuits can thus be switched independently of each other via their associated first and second switching devices 18, 19. The switching of each magnetic circuit may occur each time optionally and independently of each other by the associated high-side switches 18a, 19a or low-side switches 18b, 19b. The two switching devices 18, 19 interact with an electronic switch unit 20. In the switching state shown in FIG. 1, the control valve 14 and the redundancy valve 15 are not energized and are closed by spring force. In this way, the pressure fluid accumulator 13 is blocked off from the control pressure input P43 of the trailer control valve 2. The control pressure input P43 is thus bled. Hence, a control pressure may be present at the control pressure output P22 or at the "yellow" control pressure coupling head 22.

Figure 2:
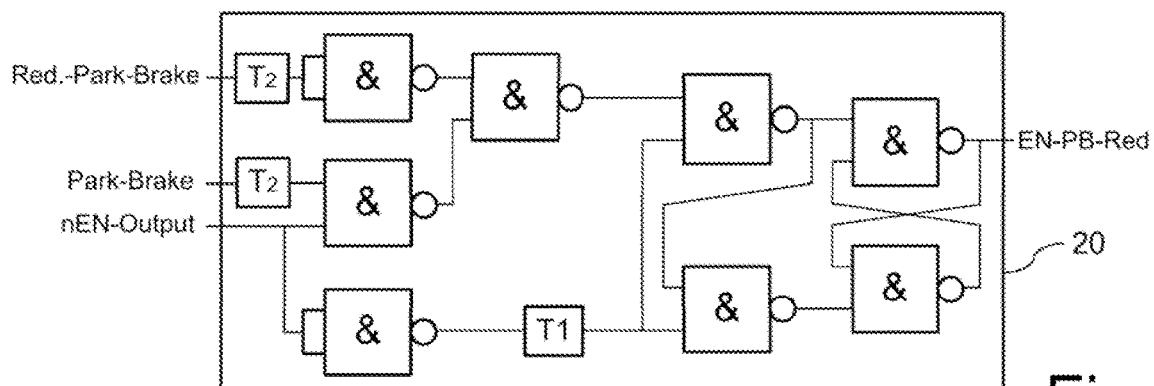
FIG. 2 shows schematically, an electronic switch unit for control of a parking brake module for a trailer brake according to FIG. 1.

The electronic switch unit 20 is shown more closely in FIG. 2. The switch unit 20 is composed of several logic switching elements, such as AND gates, OR gates, inverters and/or transfer gates. These components form a combination of flip-flop elements. The mode of operation of the elements of the switch unit 20 need not be explained here in detail. It only matters that the switch unit 20 has a holding function for input and/or output variables, which can take on the logical "1" or logical "0" value depending on a respective voltage level of the input and/or output signals, and that the switch unit 20 is able to detect or to save switching states of the control valve 14 and the redundancy valve 15. The switch unit 20 has a first input "Red.-Park-Brake", representing the switching state of the redundancy valve 15, and a second input "Park-Brake", representing the switching state of the control valve 14. A third input "nEN-Output" is provided for a switching signal or another signal of the electronic control unit 4. Moreover, the switch unit 20 has an output which provides a switching signal or another control signal "EN-PB-Red." for the redundancy valve 15. Accordingly, the magnetic circuit of the redundancy valve 15 is provided with a memory circuit in the actuation of the redundancy valve 15 by the electronic control unit 4.

Figure 3A:
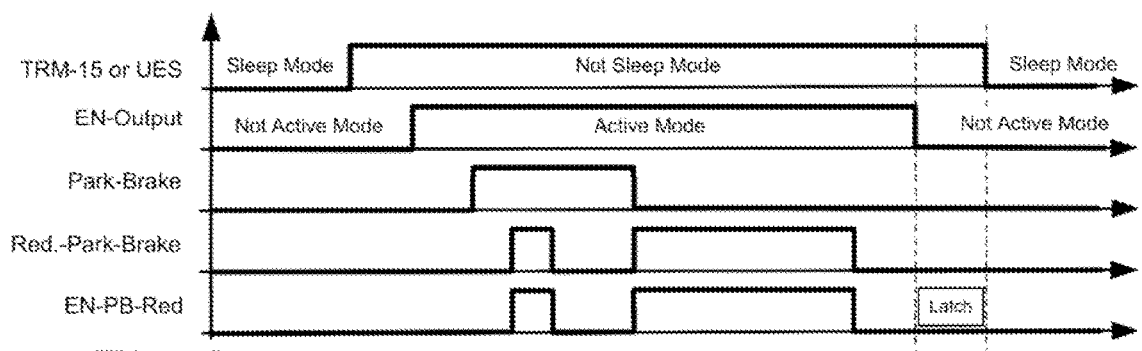
FIGS. 3(a), 3(b), and 3(c) show pulse diagrams of three exemplary pulse sequences of the switch unit of FIG. 2.
Figure 3B:
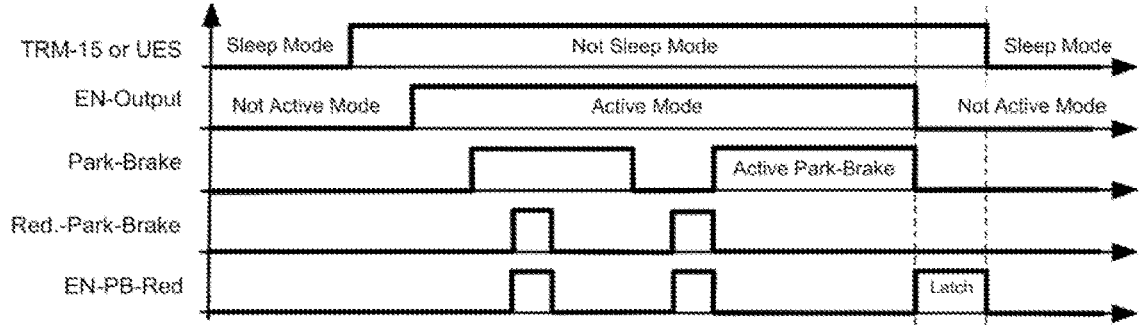
Figure 3C:
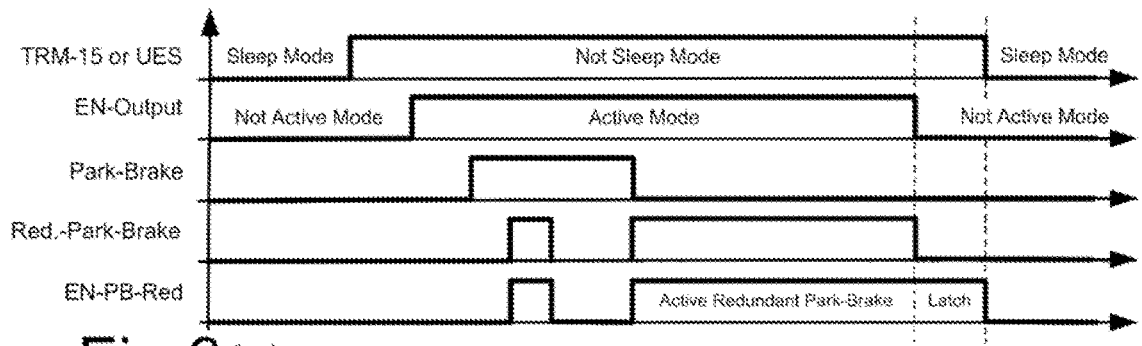

FIG. 3 shows, in order to illustrate the mode of operation of the switch unit 20, a pulse diagram with three exemplary pulse sequences (a), (b), (c) of signals relevant to the holding function such as an ignition switch signal "TRM-15/UES", a control signal "EN-Output" a control valve signal "Park-Brake", a redundancy valve signal "Red.-Park-Brake" and a redundancy valve output signal "EN-PB-Red." What matters here is that each time the last switching state is frozen in a "Hold" register before a possible fault event. The control signal "EN-Output" comes from an independent backup computer, which monitors the main computer (microcomputer) and enables the end stages.

If the electronic control unit 4 fails or a faulty operation of the control unit 4 is recognized, i.e., in a redundancy case, the switch unit 20 maintains the last state of the control valve 14 or the redundancy valve 15. This is done so long as the control unit 4 does not switch to an operationally safe resting state "Sleep Mode" or the ignition switch is switched off by the terminal TRM-15. The holding function of the switch unit 20 works as a memory circuit by which the redundancy valve 15 can be actuated. The actuation of the magnetic circuit of the redundancy valve 15 by this memory circuit of the switch unit 20 may occur either via the high-side switch 19a or via the low-side switch 19b. The other respective switch 19a, 19b is permanently switched for as long as the holding function of the switch unit 20 or the turned-on ignition system is activated. As a result, the actuation of the redundancy valve 15 by the memory circuit of the switch unit 20 has the effect that the control pressure input P43 of the trailer control valve 2 will not be bled unintentionally and unexpectedly and consequently no control pressure can be generated unintentionally and unexpectedly at the control pressure output P22 of the trailer control valve 2. In this way, the trailer 5 is protected against an unintentional and unexpected activation of the parking brake function of the trailer brake 6 of the trailer 5.

The following list of reference characters is intended to help identifying elements in the drawings:

1 Braking system of a motor vehicle
2 Trailer control valve
3 Parking brake module
4 Electronic control unit
5 Trailer vehicle
6 Trailer brake
7 First regulator valve of trailer control valve
8 Second regulator valve of trailer control valve
9 Third regulator valve of trailer control valve
10 Throttle valve of trailer control valve
11 Pressure valve of trailer control valve
12 Pressure sensor of trailer control valve
13 Pressure fluid accumulator with pressure fluid reservoir
14 Control valve of the parking brake module
15 Redundancy valve of the parking brake module
16 Changeover valve of the parking brake module
17 Closing member of the changeover valve
18 First electrical switching device
18a First high-side switch
18b First low-side switch
19 Second electrical switching device
19a Second high-side switch
19b Second low-side switch
20 Electronic switch unit
21 Reservoir pressure coupling head
22 Control pressure coupling head
E1 First electrical connecting line
E2 Second electrical connecting line
E3 Third electrical connecting line
E4 Fourth electrical connecting line
E5 Fifth electrical connecting line
E6 Sixth electrical connecting line
E7 Seventh electrical connecting line
E8 Eighth electrical connecting line
E9 Ninth electrical connecting line
E10 Tenth electrical connecting line
P3 Bleed outlet on trailer control valve
P11 Reservoir pressure input at trailer control valve
P13 Second pneumatic line of parking brake module
P14 Third pneumatic line of parking brake module
P15 Fourth pneumatic line of parking brake module
P16 Fifth pneumatic line of parking brake module
P17 First pneumatic input of changeover valve
P18 Second pneumatic input of changeover valve
P19 Pneumatic output of changeover valve
P20 First pneumatic line of parking brake module
P21 Reservoir pressure output on trailer control valve
P22 Control pressure output on trailer control valve
P42 Redundancy pressure input on trailer control valve
P43 Control pressure input on trailer control valve
TRM-15 Output terminal of an ignition switch
TRM-30 Plus pole terminal at electrical energy accumulator While the above description constitutes the preferred embodiments of the present invention, it will be appreciated that the invention is susceptible to modification, variation and change without departing from the proper scope and fair meaning of the accompanying claims.

The invention claimed is:

1. A braking system (1) for a motor vehicle including a tractor vehicle with a tractor vehicle brake and a trailer vehicle (5) with a trailer brake (6), the tractor vehicle having an ignition system for a drive engine of the tractor vehicle energized by an electrical energy accumulator of the tractor vehicle, wherein the braking system (1) is fluid operated, comprising:
a trailer control valve (2) and a parking brake module (3) which are electrically controllable,
an electronic control unit (4) for the control of the trailer brake (6) of the trailer vehicle (5), electrically connected to the trailer control valve (2) and to the parking brake module (3),
the parking brake module (3) being fluid-connected at the input side to a pressure fluid accumulator (13) of the braking system (1) of the motor vehicle and at the output side to a control pressure input (P43) of the trailer control valve (2) for selectively pressurizing or depressurizing the control pressure input (P43) of the trailer control valve (2), and
the parking brake module (3) having a redundancy circuit for pressurizing or depressurizing the control pressure input (P43) of the trailer control valve (2) even during a malfunction or a failure of the electronic control unit (4),
wherein the parking brake module (3) includes
a first directional valve configured as a control valve (14),
a second directional valve configured as a redundancy valve (15), and
a pressure-controlled changeover valve (16),
wherein the control valve (14) and the redundancy valve (15) have input sides that are respectively fluid-connected to the pressure fluid accumulator (13) and output side that are respectively fluid-connected to a respective one of two inputs (P17, P18) of the changeover valve (16),
one output (P19) of the changeover valve (16) being fluid-connected to the control pressure input (P43) of the trailer control valve (2) so that an input pressure at one or both inputs (P17, P18) of the changeover valve (16) can be passed through to the control pressure input (P43) of the trailer control valve (2),
wherein the control valve (14) is switchably connectable via a first electrical switching device (18) to the electrical energy accumulator of the tractor vehicle,
wherein the redundancy valve (15) is switchably connectable via a second electrical switching device (19) to the electrical energy accumulator and to the ignition system of the tractor vehicle,
wherein, in a first switching position of at least one of the control valve (14) and the redundancy valve (15), the pressure fluid accumulator (13) is blocked off from the control pressure input (P43) of the trailer control valve (2) and in a second switching position of the control valve (14) and/or the redundancy valve (15) the pressure fluid accumulator (13) being fluid-connected to the control pressure input (P43) of the trailer control valve (2),
wherein the electronic control unit (4) includes an electronic switch unit (20) with a holding function,
wherein the redundancy valve (15) and the control valve (14) are electronically interconnected via the switch unit (20) and the redundancy valve (15) is controllable by the switch unit (20),
wherein the holding function is configured to store a respective currently assumed first switching position or second switching position of the redundancy valve (15) or of the control valve (14),
and wherein, during a recognized malfunction or a failure of the electronic control unit (4), the most recently stored first switching position or second switching position of the control valve (14) or the redundancy valve (15), which was stored during a normal error-free operation of the electronic control unit, is maintained until the earlier one of the electronic control unit (4) switching to an operationally safe resting state or the ignition system being switched off.

2. The braking system according to claim 1, wherein the control valve (14) and the redundancy valve (15) are configured as 3/2-way, normally closed directional valves which are electromagnetically actuatable.

3. The braking system according to claim 1, wherein the control valve (14) and the redundancy valve (15) are switchable independently of each other in the normal error-free operation of the electronic control unit (4).

4. The braking system according to claim 1, wherein the first electrical switching device (18) and the second electrical switching device (19) have mutually decoupled electrical circuits for supplying electrical power to the control valve (14); and the redundancy valve (15), the control valve (14) being assigned a first high-side switch (18a), which connects a magnetic circuit of the control valve (14) switchably to the electrical energy accumulator, the control valve (14) being assigned a first low-side switch (18b), which connects the magnetic circuit of the control valve (14) switchably to ground, and the redundancy valve (15) being assigned a second high-side switch (19a), which connects the magnetic circuit of the redundancy valve (15) switchably to the ignition system and to the electrical energy accumulator of the tractor vehicle, and the redundancy valve (15) being assigned a second low-side switch (19b), which connects a magnetic circuit of the redundancy valve (15) switchably to ground.

5. A motor vehicle, such as a farming tractor vehicle and trailer combination, a semitrailer, or a platform road train, comprising a braking system according to claim 1.

* * * * *